US012512308B2

(12) United States Patent
Matsuo

(10) Patent No.: US 12,512,308 B2
(45) Date of Patent: Dec. 30, 2025

(54) CHROMATOGRAPH MASS SPECTROMETRY DATA PROCESSING METHOD, CHROMATOGRAPH MASS SPECTROMETER, AND CHROMATOGRAPH MASS SPECTROMETRY DATA PROCESSING PROGRAM

(71) Applicant: SHIMADZU CORPORATION, Kyoto (JP)

(72) Inventor: Kiriko Matsuo, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 442 days.

(21) Appl. No.: 17/999,004

(22) PCT Filed: May 28, 2020

(86) PCT No.: PCT/JP2020/021064
§ 371 (c)(1),
(2) Date: Nov. 16, 2022

(87) PCT Pub. No.: WO2021/240710
PCT Pub. Date: Dec. 2, 2021

(65) Prior Publication Data
US 2023/0178348 A1    Jun. 8, 2023

(51) Int. Cl.
*H01J 49/00* (2006.01)
*G01N 30/72* (2006.01)
(Continued)

(52) U.S. Cl.
CPC ...... *H01J 49/0036* (2013.01); *G01N 30/7233* (2013.01); *G01N 30/8631* (2013.01); *G16C 20/20* (2019.02)

(58) Field of Classification Search
CPC ................ H01J 49/0036; H01J 49/004; G01N 30/7233; G01N 30/8631; G01N 30/86;
(Continued)

(56) References Cited

U.S. PATENT DOCUMENTS 8,809,770 B2     8/2014  Bonner et al.
2006/0169883 A1*  8/2006  Wang .................. H01J 49/0009
                                                              250/282
(Continued)

FOREIGN PATENT DOCUMENTS

CN         105917221 A     8/2016
JP       2013-231715 A    11/2013
(Continued)

OTHER PUBLICATIONS

Communication dated Mar. 27, 2024, issued in Chinese Application No. 202080100607.0.
(Continued)

*Primary Examiner* — David A Vanore
(74) *Attorney, Agent, or Firm* — Sughrue Mion, PLLC

(57) ABSTRACT

One mode of a chromatograph mass spectrometer according to the present invention includes: a measurement unit (1) that includes a chromatograph unit (1A) and a mass spectrometry unit (1B) capable of performing MS/MS analysis, and collects chromatograph mass spectrometry data having three dimensions of time, m/z, and a signal intensity by repeatedly performing the MS/MS analysis by data independent analysis in the mass spectrometry unit on a sample containing a compound separated by the chromatograph unit; a component detection unit (42) that detects a compound and a component corresponding to a partial structure of the compound by obtaining MS/MS spectra of a bar graph presentation based on chromatograph mass spectrometry data over a predetermined m/z range for a target sample,
(Continued)

estimating precursor ion peaks in each of the MS/MS spectra, and selecting peaks based on a predetermined standard regarding an m/z direction in each of the MS/MS spectra and a predetermined standard regarding a time direction for peaks that can be considered to be identical or an identical group on the MS/MS spectra; a narrowing unit (43, 44) that narrows down components to be analyzed by performing screening using prior information on the detected component; and a composition estimation unit (45) that, by using m/z information corresponding to a narrowed down component, estimate a composition or a chemical formula of the component.

9 Claims, 9 Drawing Sheets

(51) Int. Cl.
  *G01N 30/86* (2006.01)
  *G16C 20/20* (2019.01)
(58) Field of Classification Search
  CPC ........... G01N 30/8675; G01N 30/8679; G01N 27/62; G01N 30/72; G16C 20/20
  See application file for complete search history.

(56) References Cited

U.S. PATENT DOCUMENTS

| | | | |
|---|---|---|---|
| 2007/0023633 A1* | 2/2007 | Wang | H01J 49/004 250/282 |
| 2008/0315081 A1* | 12/2008 | May | G16B 30/00 250/281 |
| 2012/0049058 A1* | 3/2012 | Grothe, Jr. | H01J 49/0036 250/282 |
| 2012/0158318 A1* | 6/2012 | Wright | G01N 15/02 702/28 |
| 2013/0204537 A1* | 8/2013 | Kajihara | G16B 20/00 702/20 |
| 2013/0253848 A1* | 9/2013 | Yamada | G16C 99/00 702/23 |
| 2015/0066387 A1* | 3/2015 | Yamada | H01J 49/004 702/23 |
| 2016/0042929 A1* | 2/2016 | Ogura | H01J 49/0031 250/288 |
| 2016/0180555 A1* | 6/2016 | Matsuo | G06F 3/0482 345/440 |
| 2016/0189949 A1* | 6/2016 | Ueda | H01J 49/005 250/281 |
| 2016/0343557 A1 | 11/2016 | Yamaguchi | |
| 2017/0108478 A1* | 4/2017 | Tainaka | G01N 30/7233 |
| 2017/0115261 A1* | 4/2017 | Matsuo | G01N 35/0092 |
| 2019/0011410 A1* | 1/2019 | Maeda | G01N 27/70 |
| 2019/0025253 A1* | 1/2019 | Yasuda | H01J 49/0036 |
| 2019/0170712 A1* | 6/2019 | Ueda | G01N 30/8679 |
| 2019/0189414 A1* | 6/2019 | Ikegami | H01J 49/027 |
| 2020/0152434 A1 | 5/2020 | Yamamoto et al. | |
| 2020/0355654 A1* | 11/2020 | Hobby | G01N 30/72 |
| 2022/0365095 A1* | 11/2022 | Nishikaze | G01N 30/72 |
| 2023/0178348 A1* | 6/2023 | Matsuo | G01N 30/72 250/282 |
| 2023/0236159 A1* | 7/2023 | Matsuo | G01N 30/8675 250/282 |
| 2023/0266287 A1* | 8/2023 | Katsuyama | G01N 30/8631 210/198.2 |
| 2023/0266288 A1* | 8/2023 | Katsuyama | G01N 30/8631 702/32 |

FOREIGN PATENT DOCUMENTS

| | | |
|---|---|---|
| WO | 2015/107690 A1 | 7/2015 |
| WO | 2019/012589 A1 | 1/2019 |

OTHER PUBLICATIONS

"Profiling Solution ver. 1.1 Software for profiling analysis", [online], [searched on Apr. 27, 2020], Shimadzu Corporation, Internet <https://www.an.shimadzu.co/jp/lcms/profilingsof-v11.htm, pp. 1-6.

"LabSolutions Insight™ GC/MS & LC/MS Multi-Sample Quantification Support Software LabSolutions Insight", [online], [searched on Apr. 27, 2020], Shimadzu Corporation, Internet URL:https://www.an.shimadzu.jp/datanet/labsolutions/insight/index.htm, pp. 1-4.

"Composition Estimation Software (Formula Predictor, optional)", [online], [searched on Apr. 27, 2020], Shimadzu Corporation, Internet < URL: https://www.an.shimadzu.co.jp/lcms/it-tof5.htm >, pp. 1-6.

Ivana Blazenovic et al., "Software Tools and Approaches for Compound Identification of LC-MS/MS Data in Metabolomics (Software Tools and Approaches for Compound Identification of LC-MS/MS Data in Metabolomics)", Metabolites, 2018, pp. 31, vol. 8, No. 2.

Tsugawa, Hiroshi et al., "MS-DIAL: Data Independent MS/MS Deconvolution for Comprehensive Metabolome", Analysis. Nat Methods. Author manuscript; available in PMC Dec. 1, 2015, pp. 1-22, vol. 12, No. 6, ://ncbi.nlm.nih.gov/pmc/articles/PMC4449330/pdf/nihms680470.pdf.

Sentandreu, Enrique et al., "A Survey of Orbitrap All Ion Fragmentation Analysis Assessed by an R MetaboList Package to Study Small-Molecule Metabolites", Chromatographia, May 11, 2018, pp. 981-994, vol. 81, https://doi.org/10.1007/s10337-018-3536-y.

Peris-Diaz, Manuel D. et al., "R-MetaboLitt 2: A Flexible Tool for Metabolite Annotation from High-Resolution Data-Independent Acquisition Mass Spectrometry Analysis, Metabolites", Sep. 17, 2019, pp. 1-16, vol. 9, No. 187, https://doi.org/10.3390/metabo9090187.

Tsugawa, Hiroshi, "MS/MS Spectrum Interpretation and Natural Object Structure Estimation Using Mass Spectrometry Informatics", CICSJ Bulletin https://doi. Org/10.11546/cicsj. 37.45.

International Search Report for PCT/JP2020/021064 dated Aug. 18, 2020.

Written Opinion for PCT/JP2020/021064 dated Aug. 18, 2020.

"Profiling Solution ver. 1.1 Software for profiling analysis", [online], [searched on Apr. 27, 2020], Shimadzu Corporation, Internet < URL: http://www.an.shimadzu.co.jp/lcms/profilingsof-v11.htm, pp. 1-6.

"LabSolutions Insight™ GC/MS & LC/MS Multi-Sample Quantification Support Software LabSolutions Insight", [online], [searched on Apr. 27, 2020], Shimadzu Corporation, Internet URL:https://www.an.shimadzu.co/jp/datanet/labsolutions/insight/index.htm, pp. 1-4.

Office Action dated Jul. 4, 2023 issued for the corresponding Japanese Patent Application No. 2022-527380.

Communication issued Dec. 18, 2024 in Chinese Application No. 202080100607.0.

Notice of Allowance dated Aug. 29, 2023 issued in Japanese Application No. 2022-527380.

Chinese Office Action dated Sep. 25, 2024 in Application No. 202080100607.0.

* cited by examiner

CHROMATOGRAPH MASS SPECTROMETRY DATA PROCESSING METHOD, CHROMATOGRAPH MASS SPECTROMETER, AND CHROMATOGRAPH MASS SPECTROMETRY DATA PROCESSING PROGRAM

CROSS REFERENCE TO RELATED APPLICATIONS

This application is a National Stage of International Application No. PCT/JP2020/021064 filed May 28, 2020.

TECHNICAL FIELD

The present invention relates to a chromatograph mass spectrometry data processing method for processing data collected by chromatograph mass spectrometry, a chromatograph mass spectrometer using the method, and a chromatograph mass spectrometry data processing program for realizing the method using a computer. For example, the present invention is suitable for applications such as detection of a large number of compounds contained in a sample to identify or confirm a target compound, or screening for checking the presence or absence of a large number of target compounds.

BACKGROUND ART

In a liquid chromatograph mass spectrometer (LC-MS) or a gas chromatograph mass spectrometer (GC-MS), various compounds contained in a sample are temporally separated by a chromatograph unit, and the separated compounds can be sequentially detected by a mass spectrometry unit. In the present specification, a device obtained by combining the chromatograph unit and the mass spectrometry unit, such as the LC-MS or the GC-MS, is referred to as a chromatograph mass spectrometer. In the following description, the LC-MS will be particularly described as an example, but the situation is the same in the GC-MS.

In a general LC-MS, data having three dimensions of retention time, mass-to-charge ratio, and signal intensity value can be collected by repeatedly performing scan measurement over a predetermined mass-to-charge ratio (exactly m/z in italics; however, the conventionally-used term "mass-to-charge ratio" is used herein) range in the mass spectrometry unit. Conventionally, various kinds of software for data processing have been used in order to identify an unknown compound or check the presence or absence and content of a specific compound based on the above described data using a computer.

For example, Non Patent Literature 1 discloses software named "Profiling Solution". In this software, pre-processing data (which may be hereinafter referred to as "raw data" according to common usage.) obtained by the chromatograph mass spectrometer is processed so that peaks on a mass spectrum and a chromatogram are detected, and a peak list for multivariate analysis such as principal component analysis can be created.

However, in general, such processing of peak detection using existing software has a problem that false positive or false negative results sometimes occur depending on the type of compound, or on the measurement situation such as noise or background, and the like.

The present applicant has proposed a novel method for solving such a problem in previously filed Japanese Patent Application No. 2019-154820, and provides an apparatus equipped with software (see Non Patent Literature 2) for performing processing by the proposed method.

This novel method utilizes the fact that, when an organic compound containing elements such as carbon, oxygen, or hydrogen is subjected to mass spectrometry, a plurality of peaks indicating an isotope cluster are observed relatively well in a mass spectrum. In the method, peaks included in isotope clusters are identified from among a large number of peaks observed on an actually measured mass spectrum using a prediction formula of a signal intensity ratio of the plurality of peaks included in the isotope cluster for each compound, and a monoisotopic ion peak is estimated therein. Furthermore, it also has a function of discriminating a significant peak from noise on the basis of a change in signal intensity in a time direction in a mass-to-charge ratio estimated to be a monoisotopic ion peak. By combining these various functions, a significant peak derived from a compound is detected from a large number of peaks observed on a mass spectrum, and the compound can be identified from the peak.

CITATION LIST

Patent Literature

Patent Literature 1: WO 2019/012589 A
Patent Literature 2: U.S. Pat. No. 8,809,770 B
Patent Literature 3: JP 2013-231715 A

Non Patent Literature

Non Patent Literature

Non Patent Literature 1: "Profiling Solution ver. 1.1 Software for profiling analysis", [online], [searched on Apr. 27, 2020], Shimadzu Corporation, Internet Non Patent Literature 2: "LabSolutions Insight™ GC/MS & LC/MS Multi-Sample Quantification Support Software LabSolutions Insight", [online], [searched on Apr. 27, 2020], Shimadzu Corporation, Internet Non Patent Literature 3: "Composition Estimation Software (Formula Predictor, optional)", [online], [searched on Apr. 27, 2020], Shimadzu Corporation, Internet Non Patent Literature 4: Ivana Blazenovic and 3 others, "Software Tools and Approaches for Compound Identification of LC-MS/MS Data in Metabolomics (Software Tools and Approaches for Compound Identification of LC-MS/MS Data in Metabolomics)", Metabolites, 2018, Vol. 8, No. 2, pp. 31.

SUMMARY OF INVENTION

Technical Problem

In recent years, the use of LC-MS using a tandem mass spectrometer as a detector has been rapidly developed in fields where qualitative and quantitative analysis of multiple specimens and multiple components is required, such as residual pesticide inspection in food and contaminant inspection in environmental water. In particular, a quadrupole time-of-flight mass spectrometer (Q-TOF mass spectrometer), which uses a time-of-flight mass separator as a rear-stage mass separator, can perform a measurement with higher levels of mass accuracy and mass-resolving power than commonly used triple quadrupole mass spectrometers, and therefore, has exhibited its effectiveness in the qualitative and quantitative determination of compounds contained in a complex sample.

In such LC-MS, as a method of MS/MS analysis in the mass spectrometry unit, a method called data dependent analysis (DDA: Data Dependent Analysis or Data Dependent Acquisition) and a method called data independent analysis (DIA: Data Independent Analysis or Data Independent Acquisition) are adopted (see Patent Literatures 1 and 2, etc.).

In the DDA, firstly a mass spectrum is acquired by normal mass spectrometry (hereinafter referred to as "MS analysis"). (Hereinafter, a mass spectrum acquired by MS analysis is referred to as "MS spectrum"). Subsequent to the MS analysis, MS/MS analysis using ions having a specific mass-to-charge ratio selected on the basis of signal intensity of a peak observed in the MS spectrum as precursor ions is performed, and MS/MS spectra are acquired in which various product ions are observed. In the DDA, when there is no peak satisfying an appropriate condition in the MS spectrum, the MS/MS analysis is not performed.

On the other hand, the DIA is a method in which a mass-to-charge ratio range to be measured is divided into a plurality of parts, and mass windows are set for each part. Then ions having a mass-to-charge ratio included in each mass window are collectively set as precursor ions, and product ions generated from the precursor ions are comprehensively scanned and measured to obtain MS/MS spectra for each mass window.

Unlike the DDA that performs MS/MS analysis using ions having a specific mass-to-charge ratio as precursor ions, in the DIA, MS/MS analysis using a plurality of ions included in a mass window as precursor ions is performed, and the MS/MS analysis is performed for mass windows in different mass-to-charge ratio ranges within a time that can be regarded as substantially simultaneous, so that the coverage of the MS/MS spectra is high. Therefore, the DIA is a suitable method for broadly and comprehensively qualitative and quantitative determination of a large number of compounds contained in a sample.

In the DIA, a mass-to-charge ratio width of one mass window is in a range of about 10 to 100 Da, and various product ions derived from a plurality of compounds, product ions derived from many ions contained in an isotope cluster of one compound, and the like are observed in a mixed manner in the MS/MS spectrum. Therefore, the amount of information in the MS/MS spectrum obtained by the DIA is considerably larger than the amount of information in the MS spectrum. Since the proposed technique according to the prior application described above mainly assumes MS spectrum data as a target of data processing, even if this technique is used for processing MS/MS spectrum data, the obtained information cannot be necessarily effectively used, and analysis accuracy such as estimation accuracy of a compound cannot be improved in some cases.

Furthermore, a large number of product-ion peaks derived from one compound appear in the MS/MS spectrum obtained by the DIA, and a large number of contaminants other than a target compound are contained in a sample such as blood, so that a large number of product-ion peaks derived from contaminants also appear in the MS/MS spectrum. Therefore, when peak detection is performed on an MS/MS spectrum obtained by the DIA, an enormous number of peaks are listed as peaks corresponding to compound candidates. Although the compound candidate includes a compound candidate which is of no interest to the analyst at all, the conventional method cannot efficiently exclude such an unnecessary candidate, and thus there is a problem that the burden of the work of the analyst is large and the processing time in the computer is wastefully long.

Moreover, conventionally, when it is desired to obtain the composition, molecular formula, ionic formula, and the like of a compound identified using the above-described method, it is necessary to use another software such as "Formula Predictor" (See Non Patent Literature 3 and the like.). Therefore, there is also a problem that the workload of the analyst when performing detailed analysis on the identified compound is large, and the analysis efficiency is poor.

The present invention has been made to solve such problems, and a main object of the present invention is to provide a chromatograph mass spectrometry data processing method, a chromatograph mass spectrometer, and a chromatograph mass spectrometry data processing program capable of improving identification accuracy and quantitative accuracy of a compound or estimation accuracy of a composition and a structure of a compound by appropriately using information of an MS/MS spectrum obtained by the DIA, and reducing a burden on an analyst at the time of such analysis to improve efficiency.

Solution to Problem

One mode of a chromatograph mass spectrometry data processing method according to the present invention made to solve the above problems is a chromatograph mass spectrometry data processing method that processes chromatograph mass spectrometry data having three dimensions of time, a mass-to-charge ratio, and a signal intensity collected by repeatedly performing MS/MS analysis by data independent analysis on a sample containing a compound separated by a chromatograph, the chromatograph mass spectrometry data processing method including:

a component detection step of detecting a compound and a component corresponding to a partial structure of the compound by obtaining MS/MS spectra of a bar graph presentation based on chromatograph mass spectrometry data over a predetermined mass-to-charge ratio range for a target sample, estimating precursor ion peaks in each of the MS/MS spectra, and selecting peaks based on a predetermined standard regarding a mass-to-charge ratio direction in each of the MS/MS spectra and a predetermined standard regarding a time direction for peaks that can be considered to be identical or an identical group on the MS/MS spectra;

a narrowing step of narrowing down components to be analyzed by performing screening using prior information on the component detected in the component detection step; and a composition estimation step of, by using mass-to-charge ratio information corresponding to the component narrowed down in the narrowing step, estimating a composition or a chemical formula of the component.

One mode of a chromatograph mass spectrometer according to the present invention made to solve the above problems includes:

a measurement unit including a chromatograph unit and a mass spectrometry unit capable of performing MS/MS analysis, and configured to collect chromatograph mass spectrometry data having three dimensions of time, a mass-to-charge ratio, and a signal intensity by repeatedly performing the MS/MS analysis by data independent analysis in the mass spectrometry unit on a sample containing a compound separated by the chromatograph unit;

a component detection unit configured to detect a compound and a component corresponding to a partial structure of the compound by obtaining MS/MS spectra of a bar graph presentation based on chromatograph mass spectrometry data over a predetermined mass-to-charge ratio range for a target sample, estimating precursor ion peaks in each of the MS/MS spectra, and selecting peaks based on a predetermined standard regarding a mass-to-charge ratio direction in each of the MS/MS spectra and a predetermined standard regarding a time direction for peaks that can be considered to be identical or an identical group on the MS/MS spectra;

a narrowing unit configured to narrow down components to be analyzed by performing screening using prior information on the component detected by the component detection unit; and a composition estimation unit configured to, by using mass-to-charge ratio information corresponding to a component narrowed down by the narrowing unit, estimate a composition or a chemical formula of the component.

One mode of a chromatograph mass spectrometry data processing program according to the present invention made to solve the above problems is a chromatograph mass spectrometry data processing program that, using a computer, processes chromatograph mass spectrometry data having three dimensions of time, a mass-to-charge ratio, and a signal intensity collected by repeatedly performing MS/MS analysis by data independent analysis on a sample containing a compound separated by a chromatograph, the program causing the computer to operate as:

a component detection function unit configured to detect a compound and a component corresponding to a partial structure of the compound by obtaining MS/MS spectra of a bar graph presentation based on chromatograph mass spectrometry data over a predetermined mass-to-charge ratio range for a target sample, estimating precursor ion peaks in each of the MS/MS spectra, and selecting peaks based on a predetermined standard regarding a mass-to-charge ratio direction in each of the MS/MS spectra and a predetermined standard regarding a time direction for peaks that can be considered to be identical or an identical group on the MS/MS spectra;

a narrowing function unit configured to narrow down components to be analyzed by performing screening using prior information on the component detected by the component detection function unit; and a composition estimation function unit configured to, by using mass-to-charge ratio information corresponding to a component narrowed down by the narrowing function unit, estimate a composition or a chemical formula of the component.

Here, the chromatograph may be either a liquid chromatograph or a gas chromatograph.

The data independent analysis (DIA) is a method of MS/MS analysis referred to as data independent analysis or data independent acquisition described above. In the data independent analysis, the MS/MS analysis is performed by dissociating all ions contained in a mass window having a predetermined mass-to-charge ratio width as precursor ions by collision-induced dissociation or the like. However, by appropriately adjusting dissociation conditions such as a collision energy in the collision-induced dissociation, some of the precursor ions can be subjected to subsequent mass spectrometry without being dissociated. That is, in this case, a molecular ion (for example, a proton-added molecule) derived from a certain compound and a product ion derived from the same compound are both observed in the MS/MS spectrum. On the other hand, when all the precursor ions are dissociated, only product ions are observed in the MS/MS spectrum. In this case, the MS analysis may also be performed at substantially the same timing as the MS/MS analysis, and an MS spectrum in which only precursor ions are observed may be acquired together with an MS/MS spectrum.

Advantageous Effects of Invention

In the above described modes of the chromatograph mass spectrometry data processing method, the chromatograph mass spectrometer, and the chromatograph mass spectrometry data processing program according to the present invention, the prior information may be, for example, a list of chemical formulas and masses of compounds to be analyzed, or conversely, a list of chemical formulas and masses of compounds that do not need to be analyzed.

For example, a sample derived from a living body such as blood contains a large number of compounds. Therefore, when component detection is performed in the component detection step on data obtained by chromatograph mass spectrometry of such a sample, a large number of peaks corresponding to many compound candidates are detected. On the other hand, according to the above described modes of the chromatograph mass spectrometry data processing method, the chromatograph mass spectrometer, and the chromatograph mass spectrometry data processing program according to the present invention, it is possible to narrow down a large number of compound candidates detected as mentioned above to those that the analyst pays attention to, those that should be focused on, or conversely those that are not expected to be contained in the sample, and the like by using the prior information. In addition, it is possible to calculate the composition formula, the molecular formula, the ionic formula, and the like of the compound without performing troublesome work. As a result, it is possible to efficiently identify the compound contained in the sample and to obtain the composition or the like of the compound with high accuracy while reducing the burden of work on the analyst by effectively using the information obtained by the MS/MS analysis by the DIA.

BRIEF DESCRIPTION OF DRAWINGS

FIG. 6 is a diagram illustrating an example of a display screen at the end of component detection in the LC-MS analysis system of the present embodiment.

FIG. 7 is a diagram illustrating an example of a display screen at the end of screening in the LC-MS analysis system of the present embodiment.

FIG. 8 is a view illustrating an example of a display screen at the end of a composition estimation in the LC-MS analysis system of the present embodiment.

FIGS. 9A and 9B are diagrams illustrating an example of a display screen at the end of compound identification in the LC-MS analysis system of the present embodiment.

DESCRIPTION OF EMBODIMENTS

Hereinafter, an LC-MS analysis system which is an embodiment of a chromatograph mass spectrometer according to the present invention will be described with reference to the accompanying drawings.

[Configuration of LC-MS Analysis System]

Figure 1:
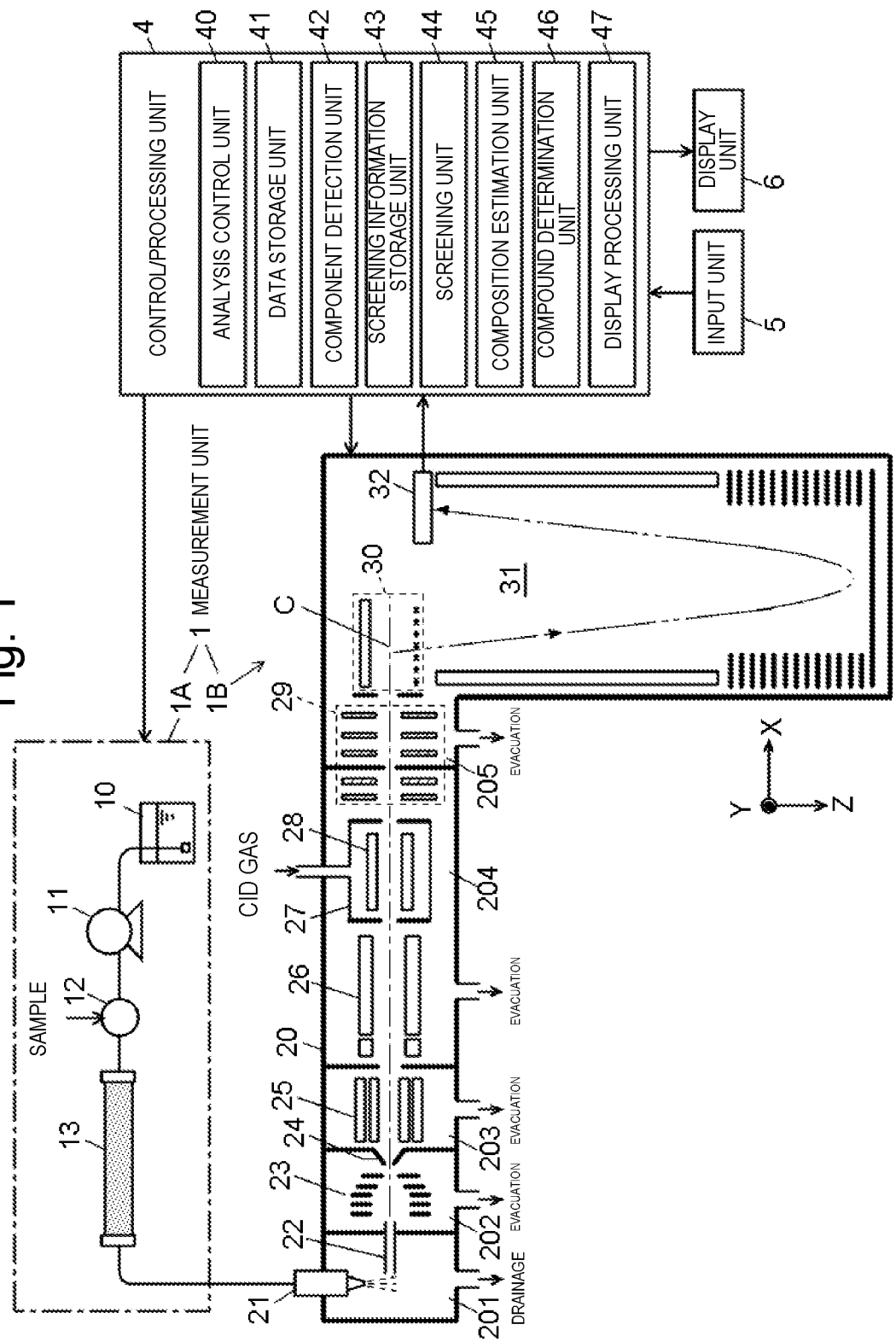
FIG. 1 is a schematic configuration diagram of an LC-MS analysis system according to an embodiment of the present invention.

FIG. 1 is a schematic configuration diagram of the LC-MS analysis system of the present embodiment.

As illustrated in FIG. 1, the LC-MS analysis system includes a measurement unit 1 including a liquid chromatograph unit 1A and a mass spectrometry unit 1B, a control/processing unit 4, an input unit 5, and a display unit 6.

The liquid chromatograph unit 1A includes a mobile phase container 10 in which a mobile phase is stored, a liquid feeding pump 11 that sucks the mobile phase and delivers the mobile phase at a substantially constant flow rate, an injector 12 that supplies a sample liquid into the mobile phase, and a column 13 that temporally separates various compounds contained in the sample liquid.

The mass spectrometry unit 1B is a quadrupole-time-of-flight (Q-TOF) mass spectrometer, and includes an ionization chamber 201 which is a substantially atmospheric pressure atmosphere, and a vacuum chamber 20 whose inside is partitioned into four. In the vacuum chamber 20, a first intermediate vacuum chamber 202, a second intermediate vacuum chamber 203, a first high vacuum chamber 204, and a second high vacuum chamber 205 are provided, and each chamber is evacuated by a vacuum pump so that a degree of vacuum increases in this order. That is, the mass spectrometry unit 1B adopts a configuration of a multi-stage differential exhaust system.

An electrospray ionization (ESI) probe 21 to which an eluate is supplied from an outlet of the column 13 is disposed in the ionization chamber 201, and the ionization chamber 201 and the first intermediate vacuum chamber 202 communicate with each other through a desolvation tube 22 having a small diameter. The first intermediate vacuum chamber 202 and the second intermediate vacuum chamber 203 communicate with each other through an orifice formed at a top of a skimmer 24, and ion guides 23 and 25 are disposed in the first intermediate vacuum chamber 202 and the second intermediate vacuum chamber 203, respectively. In the first high vacuum chamber 204, a quadrupole mass filter 26 and a collision cell 27 in which an ion guide 28 is disposed are provided. A plurality of electrodes arranged across the first high vacuum chamber 204 and the second high vacuum chamber 205 constitute an ion guide 29. Further, in the second high vacuum chamber 205, a time-of-flight mass separator of an orthogonal acceleration system including an orthogonal acceleration unit 30 and an ion flight unit 31 having a reflectron, and an ion detector 32 are provided.

The control/processing unit 4 includes, as functional blocks, an analysis control unit 40, a data storage unit 41, a component detection unit 42, a screening information storage unit 43, a screening unit 44, a composition estimation unit 45, a compound determination unit 46, and a display processing unit 47.

In general, the entity of the control/processing unit 4 is a personal computer, a workstation, or the like, and each functional block described above can be embodied by executing one or a plurality of dedicated software (computer programs) installed in such a computer in the computer. Such a computer program can be stored in a non-transitory computer-readable recording medium such as a CD-ROM, a DVD-ROM, a memory card, or a USB memory (dongle) and provided to the user. Alternatively, the information can be provided to the user in the form of data transfer via a communication line such as the Internet. Alternatively, the system can be pre-installed on a computer that is a part of the system when the user purchases the system.

[Analysis Operation of LC-MS Analysis System]

The analysis control unit 40 controls the measurement unit 1 to perform LC/MS analysis on the prepared sample. Next, a typical measurement operation executed under the control of the analysis control unit 40 will be schematically described. In this LC-MS analysis system, it is possible to selectively perform normal mass spectrometry (MS analysis) without ion dissociation and MS/MS(=$MS^2$) analysis in which ions are dissociated by collision-induced dissociation (CID).

In the liquid chromatograph unit 1A, the liquid feeding pump 11 sucks the mobile phase from the mobile phase container 10 and feeds the mobile phase to the column 13 at a substantially constant flow rate. In response to an instruction from the analysis control unit 40, the injector 12 supplies the sample into the mobile phase. The sample is carried on the mobile phase and introduced into the column 13, and a compound contained in the sample is temporally separated while passing through the column 13. The eluate from an outlet of the column 13 is introduced into the ESI probe 21, and the ESI probe 21 nebulizes the eluate into the ionization chamber 201 as charged droplets. In a process in which the charged droplets are refined and the solvent in the droplets are vaporized, the compound in the droplets becomes a gas ion.

The generated ions are sent into the first intermediate vacuum chamber 202 through the desolvation tube 22, sequentially pass through the ion guide 23, the skimmer 24, and the ion guide 25, and are introduced into the quadrupole mass filter 26 in the first high vacuum chamber 204. In the case of the MS analysis, ions are transported almost without passing through the quadrupole mass filter 26 and the collision cell 27 to the orthogonal acceleration unit 30. On the other hand, in the case of the MS/MS analysis, a predetermined voltage is applied to each of a plurality of rod electrodes constituting the quadrupole mass filter 26, and an ion species having a specific mass-to-charge ratio according to the voltage or an ion species included in a specific mass-to-charge ratio range according to the voltage is selected as a precursor ion and passes through the quadrupole mass filter 26. A collision gas such as Ar gas is introduced into the collision cell 27, and the precursor ions come into contact with the collision gas and are dissociated by the CID to generate various product ions. The generated product ions are transported to the orthogonal acceleration unit 30 via the ion guide 29.

Depending on kinetic energy (collision energy) of the ions when the precursor ions are incident on the collision cell 27, a mode of dissociation of the ions is different. Therefore, even if the precursor ions are the same, the type of product ions to be generated can be changed by appropriately adjusting the collision energy. Not all the precursor ions can be dissociated, but some of the precursor ions can be left without being dissociated. As is well known, generally, the collision energy is determined by a voltage difference between a DC bias voltage applied to the quadrupole mass filter 26 and a DC voltage applied to a lens electrode disposed at an ion inlet of the collision cell 27.

In the orthogonal acceleration unit 30, ions are accelerated substantially simultaneously in a direction (Z-axis direction) substantially orthogonal to an incident direction (X-axis direction). The accelerated ions fly at a speed corresponding to the mass-to-charge ratio, turn back and fly as indicated by a two-dot chain line in FIG. 1 in the ion flight unit 31, and reach the ion detector 32. Various ions substantially simultaneously started from the orthogonal acceleration unit 30 reach the ion detector 32 in ascending order of mass-to-charge ratio and are detected, and the ion detector 32 outputs a detection signal (ionic intensity signal) corresponding to the number of ions to the control/processing unit 4.

In the control/processing unit 4, the data storage unit 41 digitizes the detection signal, and further converts the time of flight from a time point at which the ions are ejected from the orthogonal acceleration unit 30 into a mass-to-charge ratio, thereby acquiring and storing mass spectrum data (raw data). The orthogonal acceleration unit 30 repeatedly ejects ions toward the ion flight unit 31 at a predetermined cycle. As a result, the data storage unit 41 can repeatedly acquire mass spectrum data over a predetermined mass-to-charge ratio range at a predetermined cycle.

In the LC/MS analysis, it is often difficult to perform a plurality of measurements on one sample. Therefore, it is necessary to collect as much information as possible on a large number of compounds contained in the sample by one measurement (one sample supply). Correspondingly, in the LC-MS analysis system of the present embodiment, measurement in a plurality of analysis modes including the above-described DDA and DIA is possible.

[Description of Operation in DIA Mode]

Figure 2:
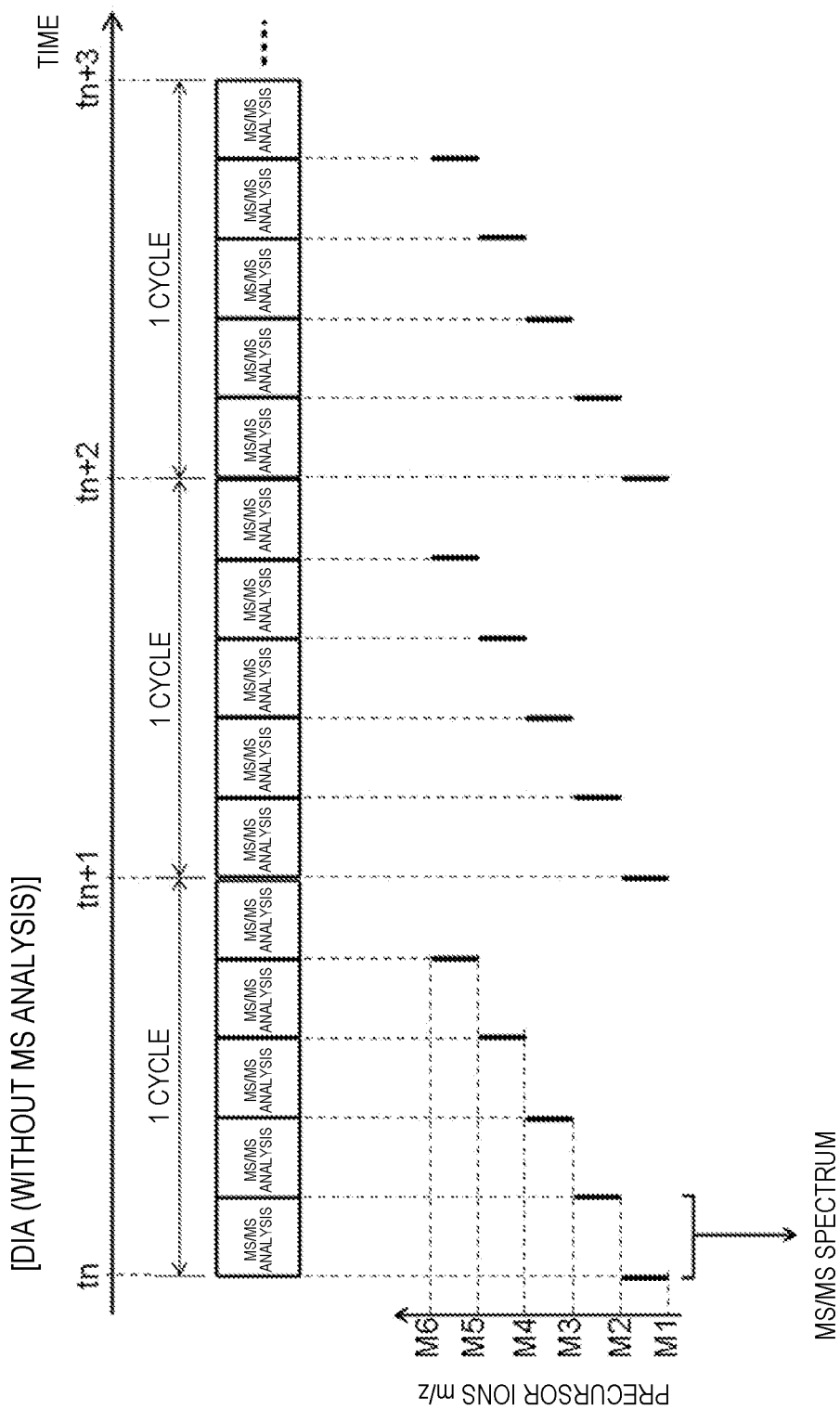
FIG. 2 is a schematic diagram illustrating analysis in a DIA mode in the LC-MS analysis system of the present embodiment.
Figure 3:
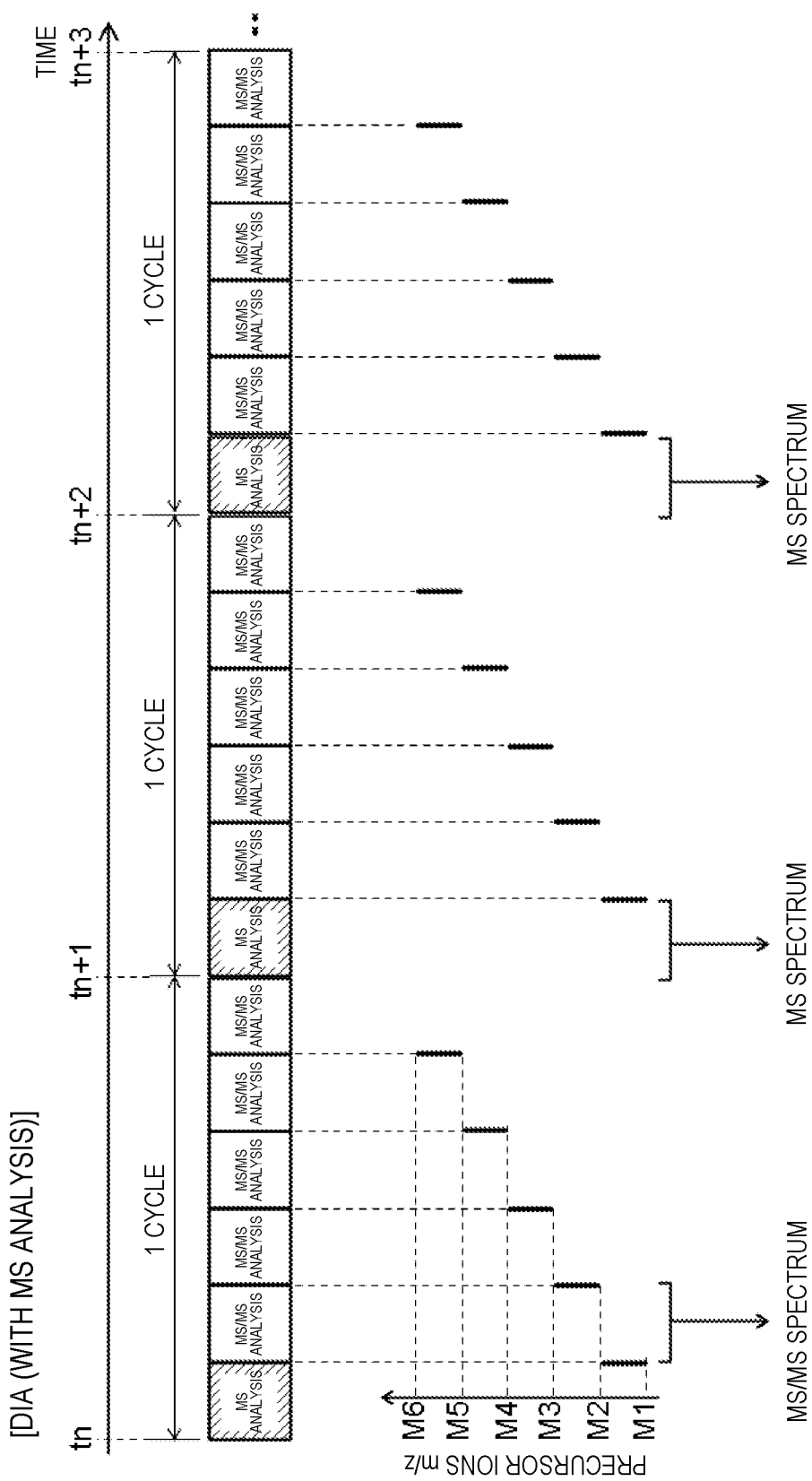
FIG. 3 is a schematic diagram illustrating analysis in the DIA mode in the LC-MS analysis system of the present embodiment.

FIGS. 2 and 3 are explanatory diagrams of analysis in the DIA mode. FIG. 2 is an example of a case where MS analysis is not performed, and FIG. 3 is an example of a case where MS analysis is periodically performed.

In the DIA, the entire mass-to-charge ratio range to be measured is divided into a plurality of parts, mass windows are set for the respective parts, ions having mass-to-charge ratios included in the respective mass windows are collectively selected as precursor ions, and MS/MS analysis is performed.

In the examples of FIGS. 2 and 3, the mass-to-charge ratio ranges M1 to M6 are divided into five, and MS/MS analysis targeting ions having mass-to-charge ratios respectively included in the five mass windows is performed. Since one MS/MS spectrum is obtained for each mass window, five MS/MS spectra are obtained in one cycle in the examples of FIGS. 2 and 3, and product ions derived from all the compounds introduced into the mass spectrometry unit 1B at that time appear in the five MS/MS spectra. That is, comprehensive product ion information on all the compounds can be obtained. As described above, when the collision energy at the time of the CID is adjusted, for example, when the collision energy is adjusted to a relatively low value, it is possible to avoid complete dissociation of the precursor ions. Therefore, a peak of the precursor ions themselves is also observed in the MS/MS spectrum. Therefore, for example, when a plurality of MS/MS spectra are acquired in which the collision energy is changed to a plurality of values including a relatively high value and a relatively low value in one cycle and the collision error is changed for each of the mass-to-charge ratio ranges M1 to M6, and one MS/MS spectrum is created by adding or averaging the plurality of MS/MS spectra, information on all product ions of the compound to be measured or information on both product ions and precursor ions can be obtained in the retention time.

By adjusting the collision energy as described above, it is possible to obtain an MS/MS spectrum in which a peak of the precursor ion itself is substantially observed. In this case, as illustrated in FIG. 2, since it is not necessary to perform the MS analysis, the time of one cycle can be shortened accordingly. On the other hand, in the DIA illustrated in FIG. 3, since the MS analysis over a predetermined mass-to-charge ratio range is performed once per cycle, an MS spectrum can be acquired separately from the MS/MS spectrum. Therefore, it is not necessary to acquire information on the precursor ions at the time of the MS/MS analysis, and for example, all the precursor ions may be dissociated by the CID at the time of the MS/MS analysis. Therefore, the signal intensity of product ions in the MS/MS spectrum is increased, and the sensitivity can be improved.

FIGS. 2 and 3 are simplified diagrams for explanation, and in general, the number of mass windows is larger, and the mass-to-charge ratio width of one mass window is in a range of about 10 to 100 Da, for example, 20 Da.

In the DIA, MS spectrum data obtained by the MS analysis and MS/MS spectrum data obtained by the MS/MS analysis can be stored in different data files for each analysis. MS spectrum data and a plurality of pieces of MS/MS spectrum data acquired at the same retention time (tn, tn+1, . . . ), or a plurality of pieces of MS/MS spectrum data may be stored in the same data file.

When the LC/MS analysis using the DIA as described above is performed on one sample, a data file storing MS spectrum data and/or MS/MS spectrum data corresponding to the LC/MS analysis is stored in the data storage unit 41. Characteristic data processing executed in the LC-MS analysis system of the present embodiment in a state where such data is stored will be described below.

[Data Processing of Compound Identification]

Figure 4:
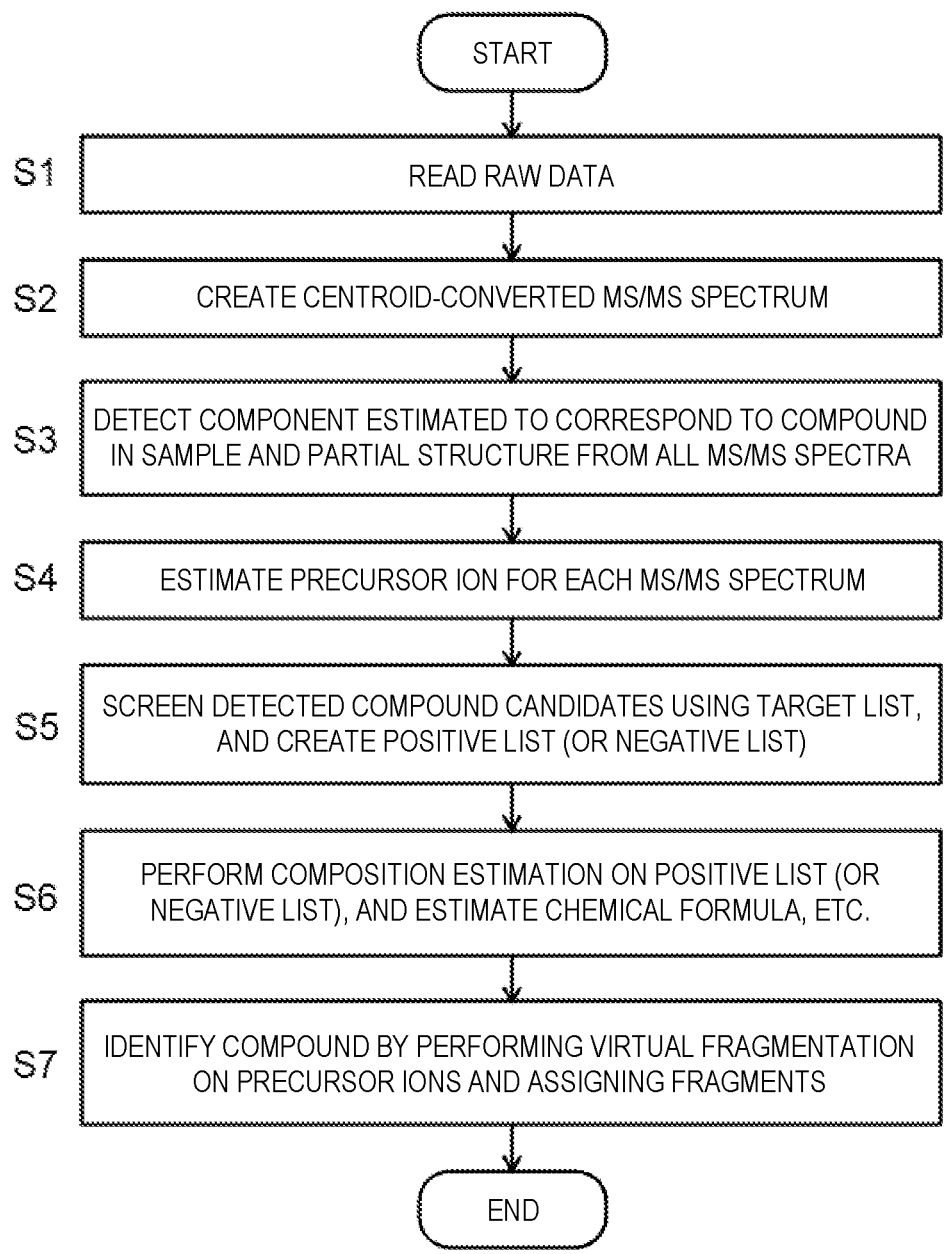
FIG. 4 is a schematic flowchart of data processing for compound identification in the LC-MS analysis system of the present embodiment.

FIG. 4 is a flowchart illustrating a schematic procedure of compound identification processing in the LC-MS analysis system of the present embodiment. After the overall processing flow is described with reference to FIG. 4, the processing of each step will be described in detail. Here, it is assumed that data in the DIA mode without MS analysis as illustrated in FIG. 2 is collected for the target sample.

The component detection unit 42 reads the raw data collected by the analysis from the data storage unit 41, and performs centroid conversion processing for each data constituting one MS/MS spectrum to obtain an MS/MS spectrum that is a bar graph presentation (steps S1 and S2). For example, in the example of FIG. 2, five MS/MS spectra are generated per cycle.

Next, the component detection unit 42 detects a significant component estimated to correspond to a compound contained in the sample and a partial structure of the compound from all the obtained MS/MS spectra (step S3). The term "component" as used herein basically corresponds to a peak observed in a three-dimensional graph of a mass-to-charge ratio axis, a time axis, and a signal intensity axis, but peaks having different mass-to-charge ratios derived from one compound or derived from one partial structure of one compound, that is, a plurality of peaks constituting an isotope cluster are aggregated and regarded as one component. In addition, the component detection unit 42 estimates a precursor ion peak for each MS/MS spectrum (step S4). For example, a peak having the highest signal intensity among peaks present in the mass-to-charge ratio range of the mass window corresponding to the MS/MS spectrum can be estimated as a precursor ion peak.

Figure 6:
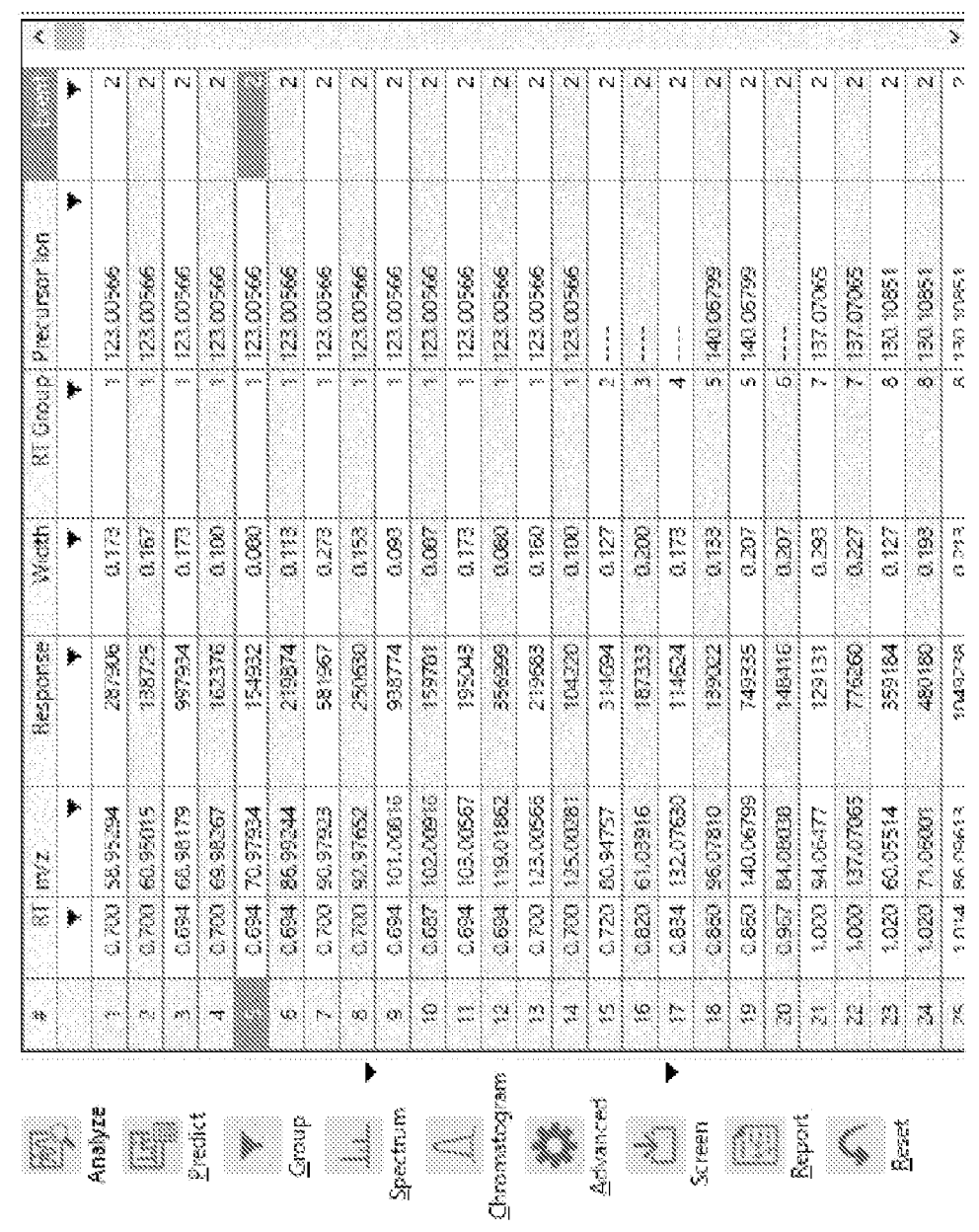

Then, the display processing unit 47 creates a component list in which the detected components are organized for each compound candidate, and displays the component list on a screen of the display unit 6. FIG. 6 is a diagram illustrating an example of the display screen at the end of steps S3 and S4. In FIG. 6, "RT" is the retention time, "m/z" is the mass-to-charge ratio, and "Response" is the signal intensity. Details will be described later.

The screening unit 44 collates the component list with a target list stored in advance in the screening information storage unit 43 to select component information described in the component list. Then, according to a screening result using the target list, as a list of compound candidates to be analyzed, either a positive list or a negative list is created from the component list (step S5). That is, the positive list is a list of components corresponding to compounds listed in the target list, and the negative list is a list of components corresponding to compounds not listed in the target list. Whether to create a positive list or a negative list is determined according to user's prior designation. In general, the number of compound candidates to be analyzed is considerably reduced by the processing in step S5.

Figure 7:
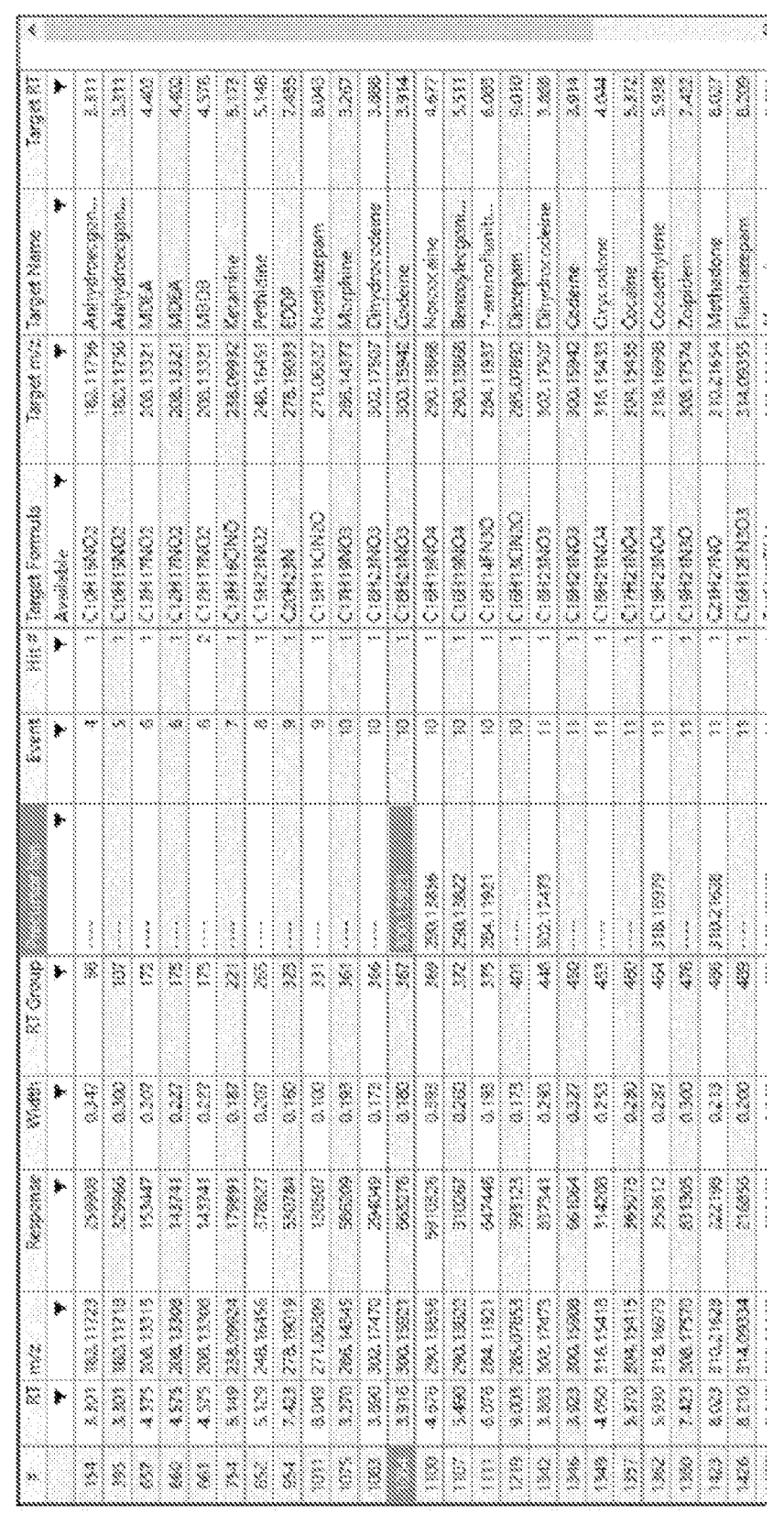

The display processing unit 47 displays the positive list or the negative list after screening on the screen of the display unit 6 instead of the component list that has been displayed so far. FIG. 7 is a diagram illustrating an example of the display screen at the end of step S5. In FIG. 7, "Target Name" is a name of a compound in the target list or a partial structure of the compound, "Target m/z" is a mass-to-charge ratio of a molecular ion of the compound or an ion of the partial structure of the compound, and "Target Formula" is a composition formula of the compound or the partial structure of the compound.

The composition estimation unit 45 estimates the composition of the compound or the partial structure corresponding to the component in accordance with a predetermined composition estimation algorithm with respect to the component information listed in the one of the positive list and the negative list designated by the user in advance, and obtains the chemical formula (including the composition formula and the ionic formula) (step S6).

Figure 8:
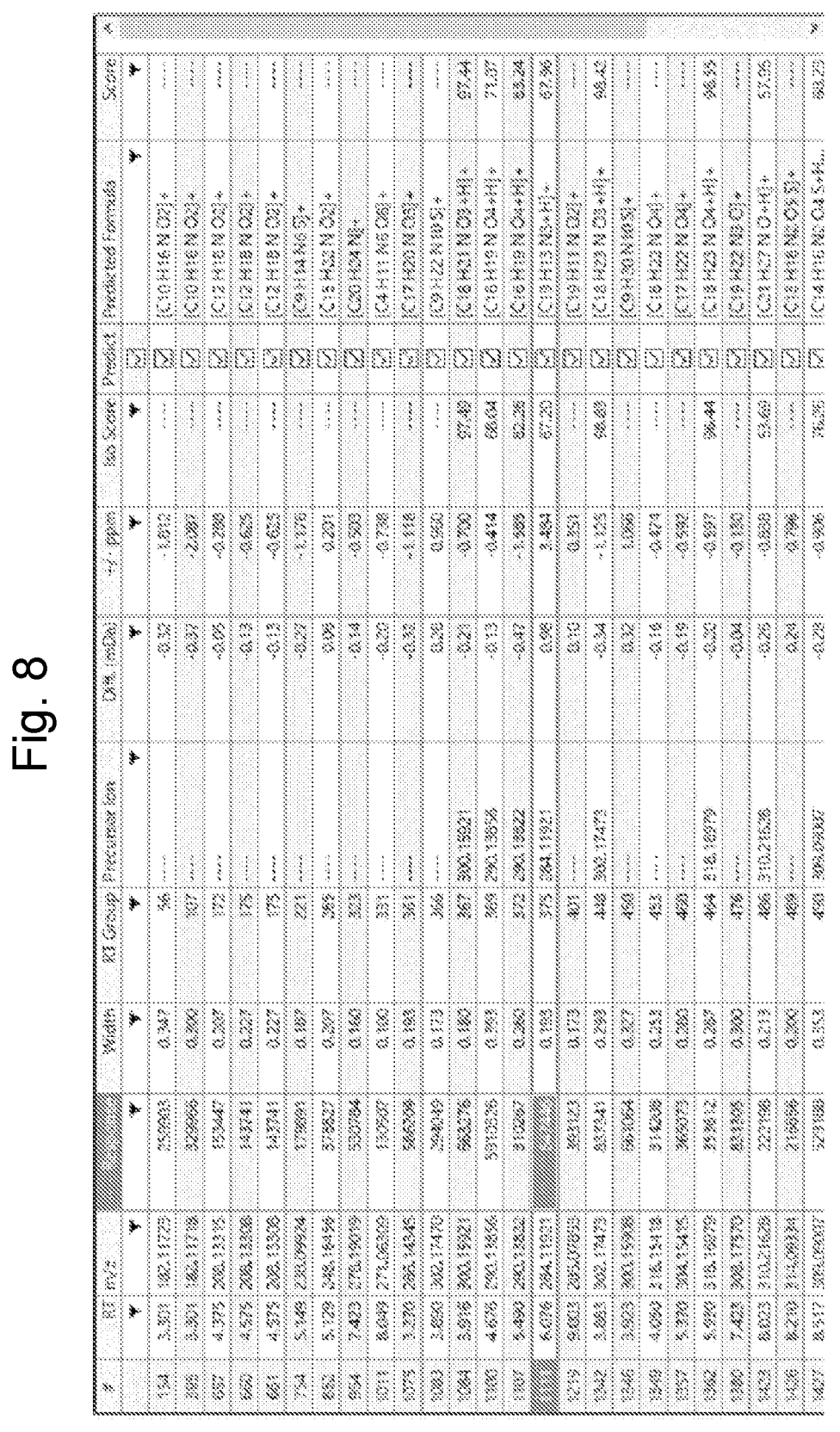

The display processing unit 47 displays the component list after the composition estimation on the screen of the display unit 6 instead of the list that has been displayed so far. FIG. 8 is a diagram illustrating an example of the display screen at the end of step S6. In FIG. 8, "Predicted Formula" is a composition formula of the estimated compound or a partial structure of the compound, and "Score" is a score value indicating the certainty of the composition estimation.

The compound determination unit 46 performs in silico fragment mapping on precursor ions based on the component information listed in the designated positive list or negative list. That is, virtual fragmentation using theoretical calculation is performed, and assignment of each fragment ion obtained by the virtual fragmentation is attempted. Thereby, the identification of the compound corresponding to the precursor ion is determined (step S7).

Figures 9A, 9B:
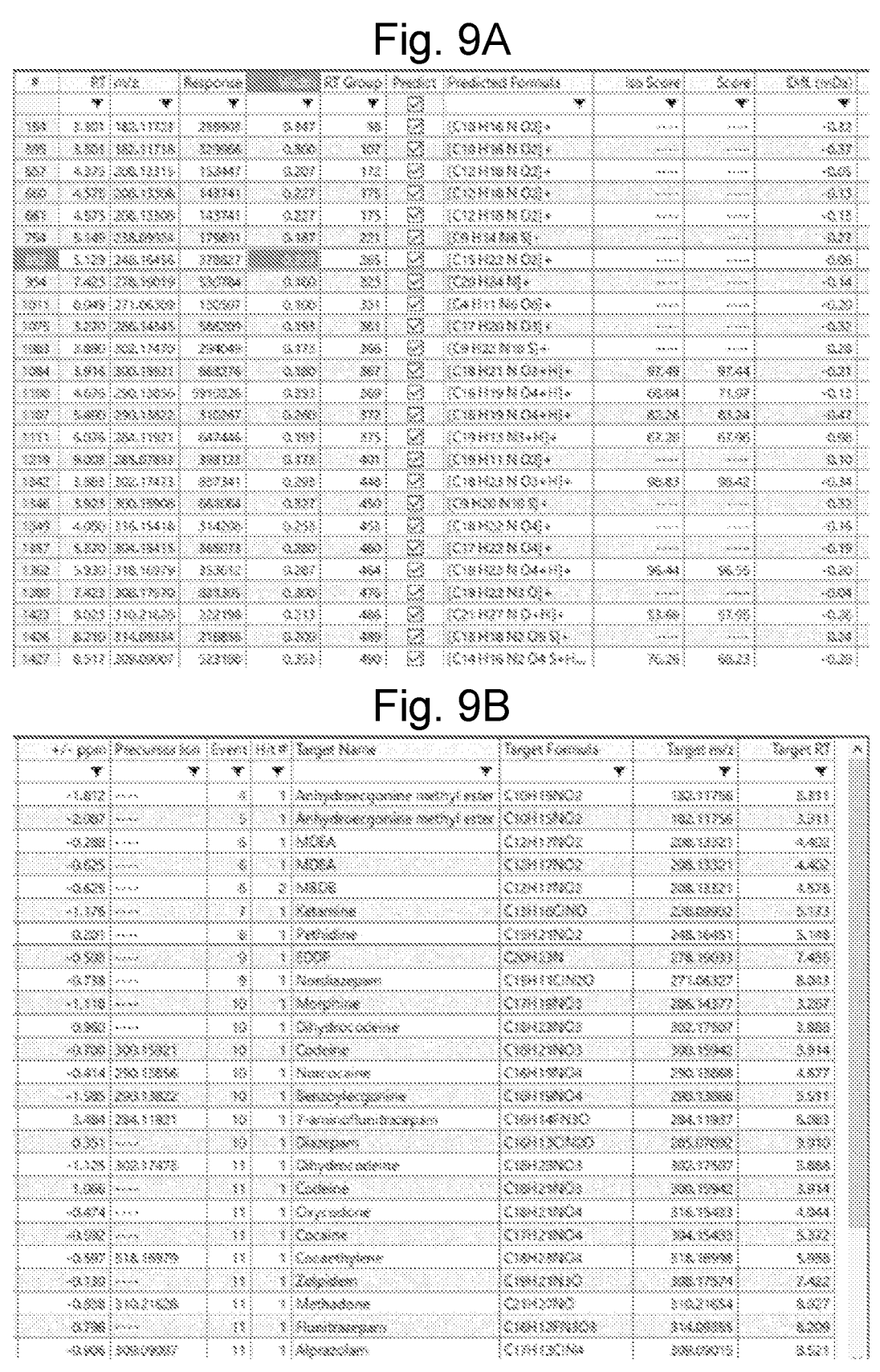

The display processing unit 47 displays the component list after the compound is determined by the in silico fragment mapping on the screen of the display unit 6 instead of the list that has been displayed so far. FIGS. 9A and 9B are diagrams illustrating an example of the display screen at the end of step S7, and FIG. 9B illustrates a portion following a right side of the list illustrated in FIG. 9A.

Through the above series of processing, for example, it is possible to confirm whether or not there is a compound that the user desires to analyze among a large number of compounds contained in the sample, and to obtain detailed information of the compound.

The processing of step S5 is not essential for performing the processing of step S6, but the processing of step S5 is important for efficiently performing the processing of step S6. Similarly, although the processing of steps S5 and S6 is not essential for performing the processing of step S7, the processing of steps S5 and S6 is important for efficiently performing the processing of step S7.

At any time point after step S3, a graph illustrating the component detection result in step S3 on the chromatogram or the MS/MS spectrum can be drawn on the screen of the display unit 6. In addition, regarding the MS/MS spectrum, a deconvolution spectrum described later can be written together, or a theoretical MS/MS spectrum can be written together after step S6.

Next, the details of processing in each of the above steps will be described.

[Steps S3 and S4: Component Detection Processing]

As an example, a component corresponding to a compound or a partial structure of the compound can be detected according to the following procedure.

Figure 5:
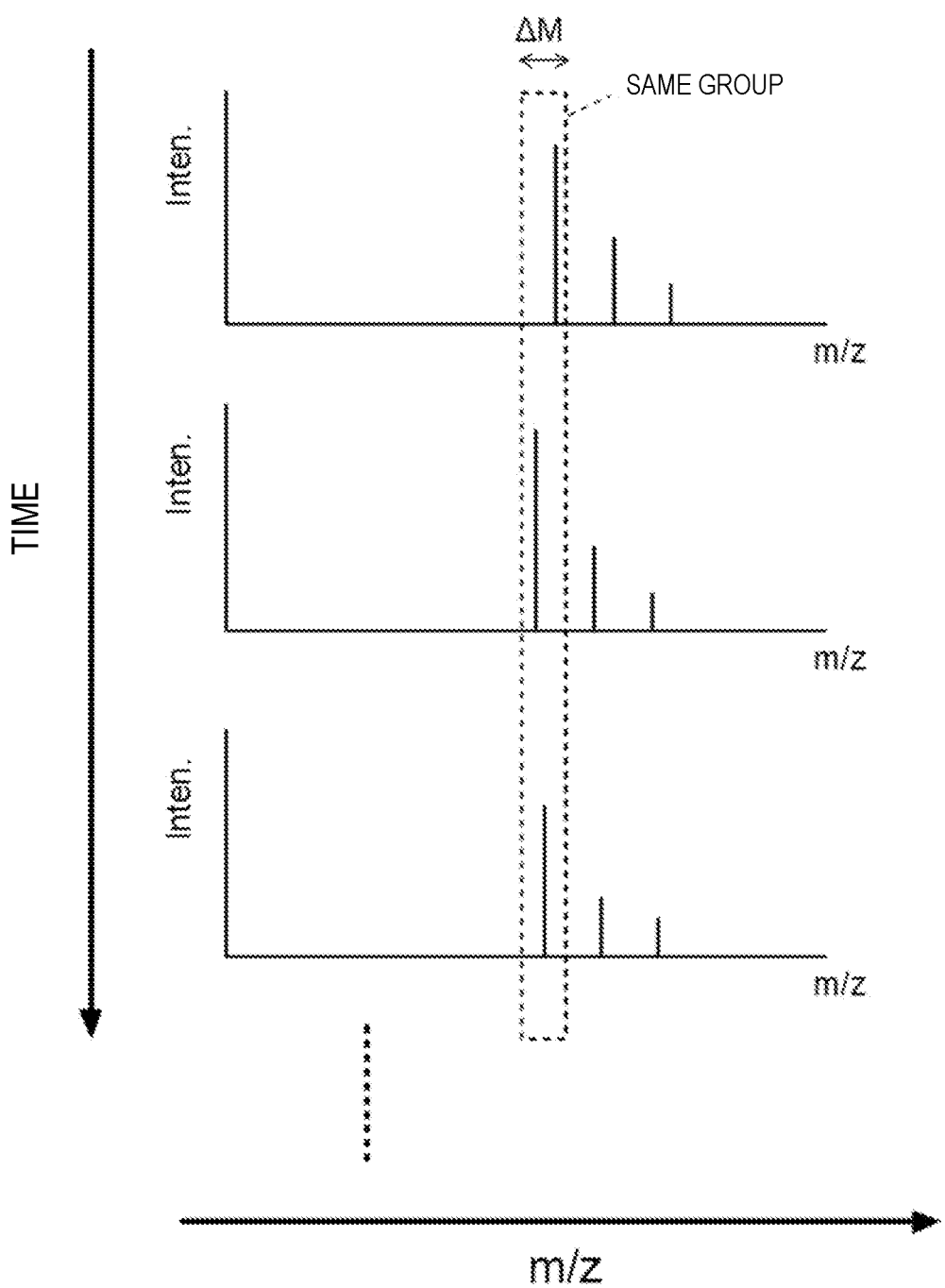
FIG. 5 is an explanatory diagram of component detection processing in the LC-MS analysis system of the present embodiment.

First, the component detection unit 42 extracts a peak (centroid peak) from each MS/MS spectrum presented by a bar graph based on a predetermined standard. Then, for the extracted centroid peak, processing of deleting an unnecessary peak or a peak estimated not to be derived from the compound and grouping peaks estimated to be derived from the same compound is performed using a peak, a characteristic of a waveform, and the like in the mass-to-charge ratio axis direction and in the time axis direction. For example, as in an example illustrated in FIG. 5, even in a case where the retention times are different from each other, a peak in which the mass-to-charge ratio falls within one mass-to-charge ratio width $\Delta M$ can be regarded as being in the same group, that is, an ion peak derived from the same compound.

Next, unnecessary peaks are deleted from the grouped peaks on the basis of criteria such as signal intensity and continuity in the time axis direction. For example, in a case where the signal intensity of a peak having the maximum signal intensity among a plurality of peaks aggregated into one group is less than or equal to a predetermined threshold, the entire group including the peak is deleted. Since one compound is detected over a certain period of time in the time axis direction due to the nature of separation in the liquid chromatograph, a group in which only a predetermined number or less of peaks are continuously present in the time axis direction is also deleted.

Thereafter, an extracted ion chromatogram is created for each peak grouped in all MS/MS spectra. That is, even if the mass-to-charge ratios are different, the extracted ion chromatogram is created assuming that the peaks belonging to the same group have the same mass-to-charge ratio. Therefore, an extracted ion chromatogram is created for each group. Using the SN ratio and the peak waveform shape of the peak appearing in the extracted ion chromatogram, the group estimated to be unnecessary is deleted, and the group is further aggregated and divided. For example, when a plurality of clearly different peaks appear on the extracted ion chromatogram, groups may be divided for each peak.

By the above processing, it is possible to detect the component estimated to be associated with the compound or the partial structure of the compound. At the time of component detection, the peak detection technique disclosed in Japanese Patent Application No. 2019-154820 described above can be appropriately used.

As described above, the components detected using all the MS/MS spectra are displayed as a component list as illustrated in FIG. 6. Since each component corresponds to a peak on the three-dimensional graph, a retention time, a mass-to-charge ratio, and a signal intensity value of a peak top of the peak are obtained. These are "RT", "m/z", and "Response" in FIG. 6. In FIG. 6, the peaks observed at m/z 123.00566 of all the components #1 to #14 are estimated to be precursor ion peaks, and thus the m/z of "Precursor Ion" of these components is 123.00566. In a case where a peak estimated to be a precursor ion peak is not observed in the MS/MS spectrum, the column of "Precursor Ion" in the component list is blank.

[Step S5: Screening Processing]

For example, in a case where a compound to be analyzed is determined in advance, a list of mass-to-charge ratios, chemical formulas, and the like of the compound is stored in a file in a predetermined format, and stored in the screening information storage unit 43 as a target list. In step S5, the file of the target list may be read, and screening may be performed on the component detection results obtained in steps S3 and S4 to narrow down compound candidates.

Specifically, in a case where the mass-to-charge ratio of the compound to be analyzed is included in the target list, a mass-to-charge ratio range having a predetermined allowable width centered on the mass-to-charge ratio value is determined, and a compound having a mass-to-charge ratio value, which is the component detection result, corresponding to the mass-to-charge ratio range is searched and left, whereby screening of compound candidates can be performed. In a case where both the mass-to-charge ratio value of the compound to be analyzed and the allowable width thereof are listed, a mass-to-charge ratio range based on the specified mass-to-charge ratio value and allowable width is determined, and a compound whose mass-to-charge ratio value, which is the peak detection result, corresponds to the mass-to-charge ratio range is searched and left, so that the compound candidates can be screened.

In a case where the chemical formula of the compound to be analyzed is included in the target list, the chemical formula in the list is converted into an ionic formula considering an adduct of a metal or the like according to the ionic polarity at the time of data acquisition, the mass-to-charge ratio is calculated from the ionic formula, and screening can be performed in the same manner as when the mass-to-charge ratio of the compound is specified. Moreover, in a case where the retention time of each compound is defined in the target list in addition to the mass-to-charge ratio and the chemical formula, a retention time range having a predetermined width is determined around the retention time, and a compound candidate whose retention time deviates from the retention time range can be excluded by screening.

Of course, as the target list, a list of compounds that do not require analysis may be prepared instead of the compounds that the user wants to analyze. For example, information on a compound confirmed in the middle of the analysis of the compound identification or a compound identified in the MS analysis performed simultaneously with the MS/MS analysis (for example, in the case of the DIA mode with the MS analysis) or the MS analysis performed prior to the MS/MS analysis may be sequentially added to the target list or may be excluded from the target list.

A plurality of target lists may be combined and used for screening. For example, a compound commonly listed in a plurality of target lists may be selected by screening, or a compound other than a compound listed in another target list among compounds listed in a certain target list may be selected by screening.

[Step S6: Composition Estimation Processing]

The same algorithm as the software "Formula Prediction" described in Non Patent Literature 3 can be used for the composition estimation of the compound based on the component detection result.

When a chemical formula is obtained from an MS spectrum using "Formula Prediction", usually, a combination of elements in consideration of adducts is searched for a mass-to-charge ratio value of a target molecular ion peak observed in the MS spectrum, thereby applying an ionic formula to derive a plurality of candidates. Then, a theoretical mass spectrum with an isotope cluster is calculated from each of the plurality of ion formulae, and a score is calculated from a degree of coincidence of patterns between the theoretical mass spectrum and the actual mass spectrum. An ionic formula that gives the highest score among the scores obtained for each of a plurality of ionic formulas that can be applied is selected, and the composition and chemical formula of the compound are obtained.

On the other hand, in a case where the composition is estimated by applying "Formula Prediction" to the component detection result obtained from the MS/MS spectrum as described above, the following processing may be performed.

The component detection results obtained in steps S3 and S4 include both the component determined to be a product ion and the component determined to be a precursor ion. Therefore, when performing composition estimation for each component, the composition estimation unit 45 determines whether or not the component to be subjected to the composition estimation is a precursor ion. When it is determined that the component to be estimated for composition is a precursor ion, the MS spectrum analysis mode is selected. When it is determined that the component to be estimated for composition is not a precursor ion, the MS/MS spectrum analysis mode is selected.

In the MS spectrum analysis mode, an ionic formula by a combination of elements considering adducts is applied to the mass-to-charge ratio value of the precursor ion peak to be analyzed, similarly to the analysis based on the normal MS spectrum described above. Then, a theoretical mass spectrum with the isotope cluster calculated from the ionic formula is calculated, a score is obtained from the degree of coincidence of the pattern between the theoretical mass spectrum and the actual MS spectrum, and the ionic formula giving the maximum score is selected to obtain the composition and the chemical formula of the compound. Since other components having the same mass-to-charge ratio as the components determined to be precursor ions in the component detection result can be estimated to be precursor ions in the same manner, the composition can be obtained in the MS spectrum analysis mode of "Formula Prediction". Incidentally, the method disclosed in Patent Literature 3 can also be used for composition estimation based on the isotope distribution.

On the other hand, in the MS/MS spectrum analysis mode, a combination of elements having the smallest difference from the mass-to-charge ratio value of the component to be analyzed is searched using the masses of a plurality of elements determined in advance. The kind of the element to be used may be determined according to the kind of the sample to be analyzed and the like, and in a general organic compound, at least carbon, hydrogen, oxygen, and nitrogen are used as elements, and elements such as sulfur, phosphorus, chlorine, and bromine can be further added, and various metals such as sodium and potassium can be further added.

By switching the composition estimation method after determining whether the component to be analyzed is the precursor ion or the product ion as described above, it is possible to more accurately estimate the composition for both the precursor ion and the product ion.

[Step S7: Identification of Final Compound]

As a method of attributing product ions by the virtual fragmentation, various known techniques (for example, a method of In silico fragmentation described in Non Patent Literature 4, and the like) can be used. In a case where product ions are assigned on the basis of the component detection results obtained in steps S3 and S4, the component detection results can be directly used as a search key when searching the chemical structure database. That is, when the composition estimation as described above is performed, since a chemical formula is obtained as a result of the estimation, the chemical formula may be used as a search key to search a known chemical structure database. On the other hand, in a case where the above-described composition estimation has not been performed and the chemical formula has not been obtained, a search for the chemical structure database may be performed using a mass-to-charge ratio range obtained by applying a predetermined allowable width to the mass-to-charge ratio of the component as a search key.

[Other Functions]

As described above, in the MS/MS spectrum obtained in the DIA mode, product ion peaks derived from a plurality of precursor ions are usually observed in mixture. In the above data processing, each product ion can be assigned to the precursor ion in the peak detection result in step S3. Therefore, a deconvolution spectrum in which only product-ion peaks derived from specific precursor ions are collected can be created using the assignment result. Since the deconvolution spectrum thus obtained is a pure, that is, an MS/MS spectrum for only one precursor ion, it is also possible to identify a compound by directly subjecting this MS/MS spectrum to library search.

In the LC-MS analysis system of the present embodiment, when any one component is selected and instructed on the list while the component list as illustrated in FIGS. 6 to 9 is displayed on the screen, an actually measured MS spectrum or MS/MS spectrum related to the instructed component, an extracted ion chromatogram, an average MS/MS spectrum (for example, an average MS/MS spectrum over the entire retention time during which the component is observed on the extraction ion chromatogram), a theoretical MS/MS spectrum, a deconvolution spectrum, or the like may be appropriately displayed on the screen.

The above embodiment is an example of the present invention, and it is obvious that modifications, changes, and additions appropriately made within the scope of the gist of the present invention are included in the claims of the present application.

For example, the above embodiment is an LC-MS analysis system, but it is obvious that the present invention can also be applied to a GC-MS analysis system in which a chromatograph is a gas chromatograph.

In the system of the above embodiment, the quadrupole-time-of-flight mass spectrometer is used as the mass spectrometry unit 1B, but other tandem mass spectrometers such as a triple quadrupole mass spectrometer and an ion trap time-of-flight mass spectrometer can also be used. However, since high mass accuracy is usually required when the composition is estimated from the mass-to-charge ratio value, it is desirable to use a high-mass accuracy device such as a time-of-flight mass spectrometer or a Fourier transform ion cyclotron resonance mass spectrometer.

In the above description, some existing software that can be used at the time of data processing has been exemplified, but it is a matter of course that these are merely examples.

[Various Modes]

It is apparent to those skilled in the art that the exemplary embodiments described above are specific examples of the following modes.

(Clause 1) One mode of a chromatograph mass spectrometry data processing method according to the present invention is a chromatograph mass spectrometry data processing method that processes chromatograph mass spectrometry data having three dimensions of time, a mass-to-charge ratio, and a signal intensity collected by repeatedly performing MS/MS analysis by data independent analysis on a sample containing a compound separated by a chromatograph, the chromatograph mass spectrometry data processing method including:

a component detection step of detecting a compound and a component corresponding to a partial structure of the compound by obtaining MS/MS spectra of a bar graph presentation based on chromatograph mass spectrometry data over a predetermined mass-to-charge ratio range for a target sample, estimating precursor ion peaks in each of the MS/MS spectra, and selecting peaks based on a predetermined standard regarding a mass-to-charge ratio direction in each of the MS/MS spectra and a predetermined standard regarding a time direction for peaks that can be considered to be identical or an identical group on the MS/MS spectra;

a narrowing step of narrowing down components to be analyzed by performing screening using prior information on the component detected in the component detection step; and a composition estimation step of, by using mass-to-charge ratio information corresponding to the component narrowed down in the narrowing step, estimating a composition or a chemical formula of the component.

(Clause 5) One mode of a chromatograph mass spectrometer according to the present invention includes:

a measurement unit including a chromatograph unit and a mass spectrometry unit capable of performing MS/MS analysis, and configured to collect chromatograph mass spectrometry data having three dimensions of time, a mass-to-charge ratio, and a signal intensity by repeatedly performing the MS/MS analysis by data independent analysis in the mass spectrometry unit on a sample containing a compound separated by the chromatograph unit;

a component detection unit configured to detect a compound and a component corresponding to a partial structure of the compound by obtaining MS/MS spectra of a bar graph presentation based on chromatograph mass spectrometry data over a predetermined mass-to-charge ratio range for a target sample, estimating precursor ion peaks in each of the MS/MS spectra, and selecting peaks based on a predetermined standard regarding a mass-to-charge ratio direction in each of the MS/MS spectra and a predetermined standard regarding a time direction for peaks that can be considered to be identical or an identical group on the MS/MS spectra;

a narrowing unit configured to narrow down components to be analyzed by performing screening using prior information on the component detected by the component detection unit; and a composition estimation unit configured to, by using mass-to-charge ratio information corresponding to a component narrowed down by the narrowing unit, estimate a composition or a chemical formula of the component.

(Clause 9) One mode of a chromatograph mass spectrometry data processing program according to the present invention is a chromatograph mass spectrometry data processing program that, using a computer, processes chromatograph mass spectrometry data having three dimensions of time, a mass-to-charge ratio, and a signal intensity collected by repeatedly performing MS/MS analysis by data independent analysis on a sample containing a compound separated by a chromatograph, the program causing the computer to operate as:

a component detection function unit configured to detect a compound and a component corresponding to a partial structure of the compound by obtaining MS/MS spectra of a bar graph presentation based on chromatograph mass spectrometry data over a predetermined mass-to-charge ratio range for a target sample, estimating precursor ion peaks in each of the MS/MS spectra, and selecting peaks based on a predetermined standard regarding a mass-to-charge ratio direction in each of the MS/MS spectra and a predetermined standard regarding a time direction for peaks that can be considered to be identical or an identical group on the MS/MS spectra;

a narrowing function unit configured to narrow down components to be analyzed by performing screening using prior information on the component detected by the component detection function unit; and a composition estimation function unit configured to, by using mass-to-charge ratio information corresponding to a component narrowed down by the narrowing function unit, estimate a composition or a chemical formula of the component.

According to the method recited in Clause 1, the device recited in Clause 5, and the program recited in Clause 9, even in a case where the number of compounds contained in the sample is very large, it is possible to narrow down a large number of detected compound candidates to those that the analyst pays attention to, those that should be focused on, or conversely those that are not expected to be contained in the sample, and the like by using the prior information, and in addition, it is possible to calculate the composition formula, the molecular formula, the ionic formula, and the like of the compound without performing troublesome work. As a result, it is possible to efficiently identify the compound contained in the sample and to obtain the composition and the like of the compound with high accuracy while reducing the burden of the work of the analyst by effectively using the information obtained by the MS/MS analysis by the DIA.

(Clause 2, Clause 6, and Clause 10) In the method according to Clause 1, the device according to Clause 5, and the program according to Clause 9, the prior information may be a list of mass-to-charge ratios or chemical formulas for the compound and the partial structure of the compound, and in the narrowing step, narrowing may be performed on condition that the compound and the partial structure are listed or not listed in the list.

According to the method recited in Clause 2, the device recited in Clause 6, and the program recited in Clause 10, for example, it is possible to confirm whether or not only a compound that draws the user's (analyst's) attention or needs to be analyzed is included in the sample, and to grasp the composition and the chemical formula of the compound.

(Clause 3, Clause 7, and Clause 11) In the method according to Clause 1, the device according to Clause 5, and the program according to Clause 9, the composition estimation step, the composition estimation unit, or the composition estimation function unit may determine whether the component to be estimated for composition is a precursor ion or a product ion, and estimate the composition or the chemical formula in different procedures according to the determination result.

(Clause 4, Clause 8, and Clause 12) In the method according to Clause 3, the device according to Clause 7, and the program according to Clause 11, when the component to be estimated for composition is a product ion, a combination of types and a number of elements that minimize a difference from a mass-to-charge ratio value of the component may be searched for to estimate the composition or the chemical formula, and when the component to be estimated for composition is a precursor ion, a theoretical spectrum including an isotope cluster may be calculated based on a chemical formula estimated from a mass-to-charge ratio value of the component, and the composition or the chemical formula may be estimated using a degree of coincidence between the spectrum and an actually measured spectrum.

According to the method recited in Clause 3 and Clause 4, the device recited in Clause 7 and Clause 8, and the program recited in Clause 11 and Clause 12, the compositions of the compound and the partial structure of the compound can be estimated with high accuracy from both the precursor ions and the product ions observed in the MS/MS spectrum acquired by the DIA. The MS/MS spectra obtained by the DIA are highly exhaustive. Therefore, the compound contained in the sample can be detected and analyzed exhaustively, that is, without leaking.

REFERENCE SIGNS LIST

1 . . . Measurement Unit
1A . . . Liquid Chromatograph Unit
10 . . . Mobile Phase Container
11 . . . Liquid Feeding Pump
12 . . . Injector
13 . . . Column
1B . . . Mass Spectrometry Unit
20 . . . Vacuum Chamber
201 . . . Ionization Chamber
202 . . . First Intermediate Vacuum Chamber
203 . . . Second Intermediate Vacuum Chamber
204 . . . First High Vacuum Chamber
205 . . . Second High Vacuum Chamber
21 . . . Electrospray Ionization (ESI) Probe
22 . . . Desolvation Tube
23 . . . Ion Guide
24 . . . Skimmer
25, 28, 29 . . . Ion Guide
26 . . . Quadrupole Mass Filter
27 . . . Collision Cell
30 . . . Orthogonal Acceleration Unit
31 . . . Ion Flight Unit
32 . . . Ion Detector
4 . . . Control/Processing Unit
40 . . . Analysis Control Unit
41 . . . Data Storage Unit
42 . . . Component Detection Unit
43 . . . Screening Information Storage Unit
44 . . . Screening Unit
45 . . . Composition Estimation Unit
46 . . . Compound Determination Unit
47 . . . Display Processing Unit
5 . . . Input Unit
6 . . . Display Unit

The invention claimed is:

1. A chromatograph mass spectrometry data processing method that processes chromatograph mass spectrometry data having three dimensions of time, a mass-to-charge ratio, and a signal intensity collected by repeatedly performing MS/MS analysis by data independent analysis on a sample containing a compound separated by a chromatograph, the chromatograph mass spectrometry data processing method comprising:

obtaining MS/MS spectra based on chromatograph mass spectrometry data over a predetermined mass-to-charge ratio range for a target sample, estimating precursor ion peaks in each of the MS/MS spectra, selecting peaks based on a predetermined standard regarding a mass-to-charge ratio direction in each of the MS/MS spectra and a predetermined standard regarding a time direction for peaks that can be considered to be identical or an identical group on the MS/MS spectra, and detecting components corresponding to a compound and a partial structure of the compound based on the selected peaks;

narrowing down components to be analyzed by performing, on the detected component, screening using a list of mass-to-charge ratios or chemical formulas for the compound and the partial structure of the compound as prior information on condition that the compound and the partial structure are included or not included in the list, wherein the list includes a mass-to-charge ratio range including a predetermined allowable width centered on a predetermined mass-to-charge ratio value;

by using mass-to-charge ratio information corresponding to the narrowed-down component, estimating a composition or a chemical formula of the component; and displaying, on a screen of a display unit, a list of the estimated composition or the estimated chemical formula.

2. The chromatograph mass spectrometry data processing method according to claim 1, wherein in the composition estimation, it is determined whether the component to be estimated for composition is a precursor ion or a product ion, and the composition or the chemical formula is estimated by a different procedure according to a determination result.

3. The chromatograph mass spectrometry data processing method according to claim 2, wherein in the composition estimation, when the component to be estimated for composition is a product ion, the composition or the chemical formula is estimated by searching for a combination of types and a number of elements that minimize a difference from a mass-to-charge ratio value of the component, and when the component to be estimated for composition is a precursor ion, a theoretical spectrum including an isotope cluster is calculated based on a chemical formula estimated from a mass-to-charge ratio value of the component, and the composition or the chemical formula is estimated using a degree of coincidence between the spectrum and an actually measured spectrum.

4. A chromatograph mass spectrometer comprising:

a measurement unit including a chromatograph unit and a mass spectrometry unit capable of performing MS/MS analysis, and configured to collect chromatograph mass spectrometry data having three dimensions of time, a mass-to-charge ratio, and a signal intensity by repeatedly performing MS/MS analysis by data independent analysis in the mass spectrometry unit on a sample containing a compound separated by the chromatograph unit;

a detector configured obtain MS/MS spectra based on chromatograph mass spectrometry data over a predetermined mass-to-charge ratio range for a target sample, estimate precursor ion peaks in each of the MS/MS spectra, select peaks based on a predetermined standard regarding a mass-to-charge ratio direction in each of the MS/MS spectra and a predetermined standard regarding a time direction for peaks that can be considered to be identical or an identical group on the MS/MS spectra, and detect components corresponding to a compound and a partial structure of the compound based on the selected peaks;

a memory; and at least one processor configured to narrow down components to be analyzed by performing, on the detected component, screening using a list of mass-to-charge ratios or chemical formulas for the compound and the partial structure of the compound as prior information on condition that the compound and the partial structure are included or not included in the list, wherein the list includes a mass-to-charge ratio range including a predetermined allowable width centered on a predetermined mass-to-charge ratio value;

by using mass-to-charge ratio information corresponding to a narrowed-down component, estimate a composition or a chemical formula of the component; and display, on a screen of a display unit, a list of the estimated composition or the estimated chemical formula.

5. The chromatograph mass spectrometer according to claim 4, wherein the at least one processor is configured to determine whether the component to be estimated for composition is a precursor ion or a product ion, and estimate the composition or the chemical formula by a different procedure according to a determination result.

6. The chromatograph mass spectrometer according to claim 5, wherein the at least one processor is configured to estimate the composition or the chemical formula by searching for a combination of types and a number of elements that minimize a difference from a mass-to-charge ratio value of the component when the component to be estimated for composition is a product ion, and calculate a theoretical spectrum including an isotope cluster based on a chemical formula estimated from a mass-to-charge ratio value of the component and estimate the composition or the chemical formula using a degree of coincidence between the spectrum and an actually measured spectrum when the component to be estimated for composition is a precursor ion.

7. A non-transitory computer-readable storage medium storing a chromatograph mass spectrometry data processing program that, using a computer, processes chromatograph mass spectrometry data having three dimensions of time, a mass-to- charge ratio, and a signal intensity collected by repeatedly performing MS/MS analysis by data independent analysis on a sample containing a compound separated by a chromatograph, the program causing the computer to:

obtain MS/MS spectra based on chromatograph mass spectrometry data over a predetermined mass-to-charge ratio range for a target sample, estimate precursor ion peaks in each of the MS/MS spectra, select peaks based on a predetermined standard regarding a mass-to-charge ratio direction in each of the MS/MS spectra and a predetermined standard regarding a time direction for peaks that can be considered to be identical or an identical group on the MS/MS spectra, and detect components corresponding to a compound and a partial structure of the compound based on the selected peaks;

narrow down components to be analyzed by performing, on the component detected by the component detection unit, screening using a list of mass-to-charge ratios or chemical formulas for the compound and the partial structure of the compound as prior information on condition that the compound and the partial structure are included or not included in the list, wherein the list includes a mass-to-charge ratio range including a predetermined allowable width centered on a predetermined mass-to-charge ratio value;

by using mass-to-charge ratio information corresponding to a narrowed-down component estimate a composition or a chemical formula of the component; and display, on a screen of a display unit, a list of the estimated composition or the estimated chemical formula.

8. The non-transitory computer-readable storage medium storing a chromatograph mass spectrometry data processing program according to claim 7, wherein program causing the computer to determine whether the component to be estimated for composition is a precursor ion or a product ion, and estimate the composition or the chemical formula by a different procedure according to a determination result.

9. The non-transitory computer-readable storage medium storing a chromatograph mass spectrometry data processing program according to claim 8, wherein program causing the computer to estimate the composition or the chemical formula by searching for a combination of types and a number of elements that minimize a difference from a mass-to-charge ratio value of the component when the component to be estimated for composition is a product ion, and calculate a theoretical spectrum including an isotope cluster based on a chemical formula estimated from a mass-to-charge ratio value of the component and estimate the composition or the chemical formula using a degree of coincidence between the spectrum and an actually measured spectrum when the component to be estimated for composition is a precursor ion.

* * * * *